W. H. DRUMMOND.
APPARATUS FOR PRODUCING POWER.
APPLICATION FILED SEPT. 11, 1911.
1,041,253.
Patented Oct. 15, 1912.
4 SHEETS—SHEET 1.
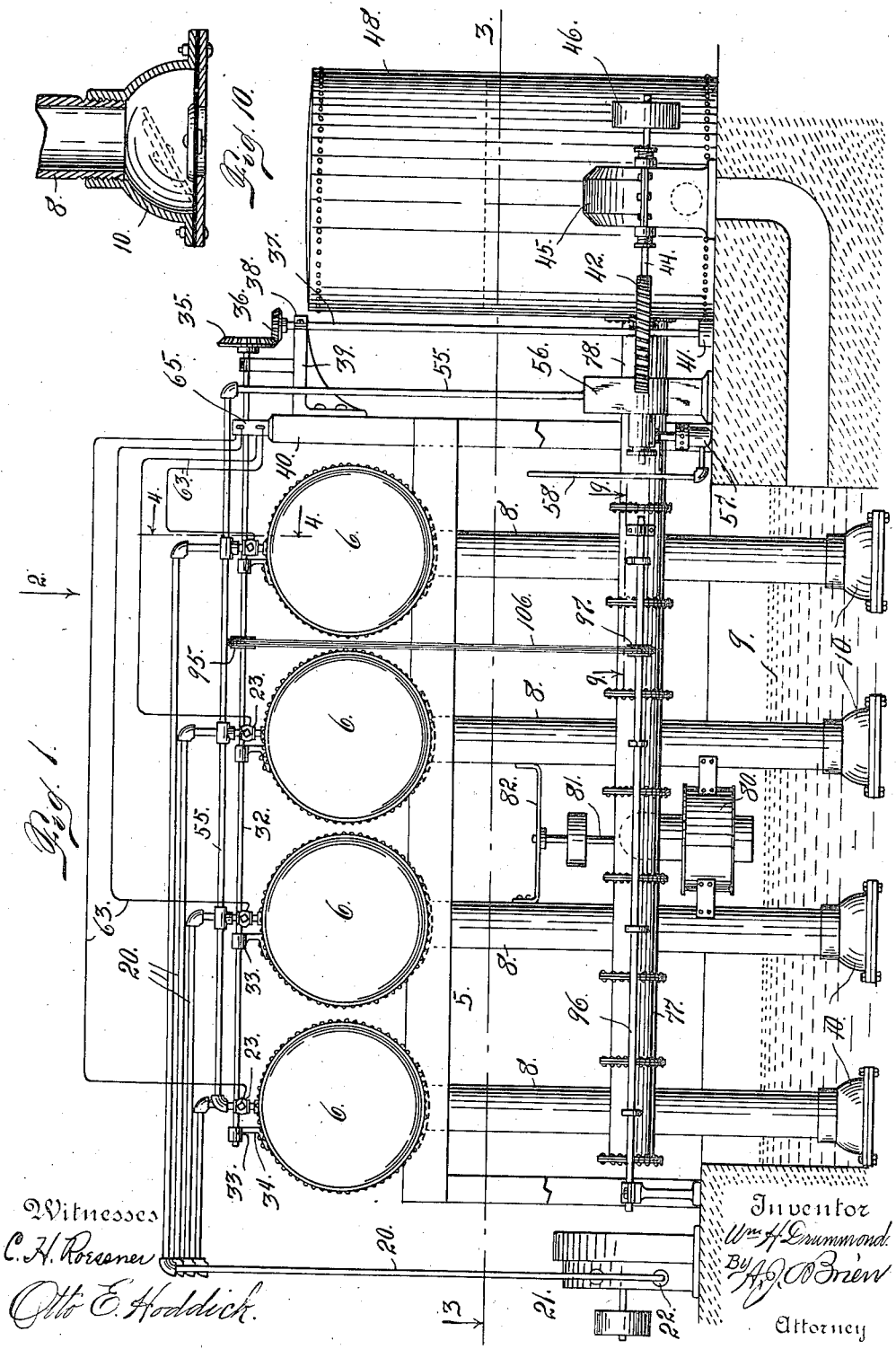

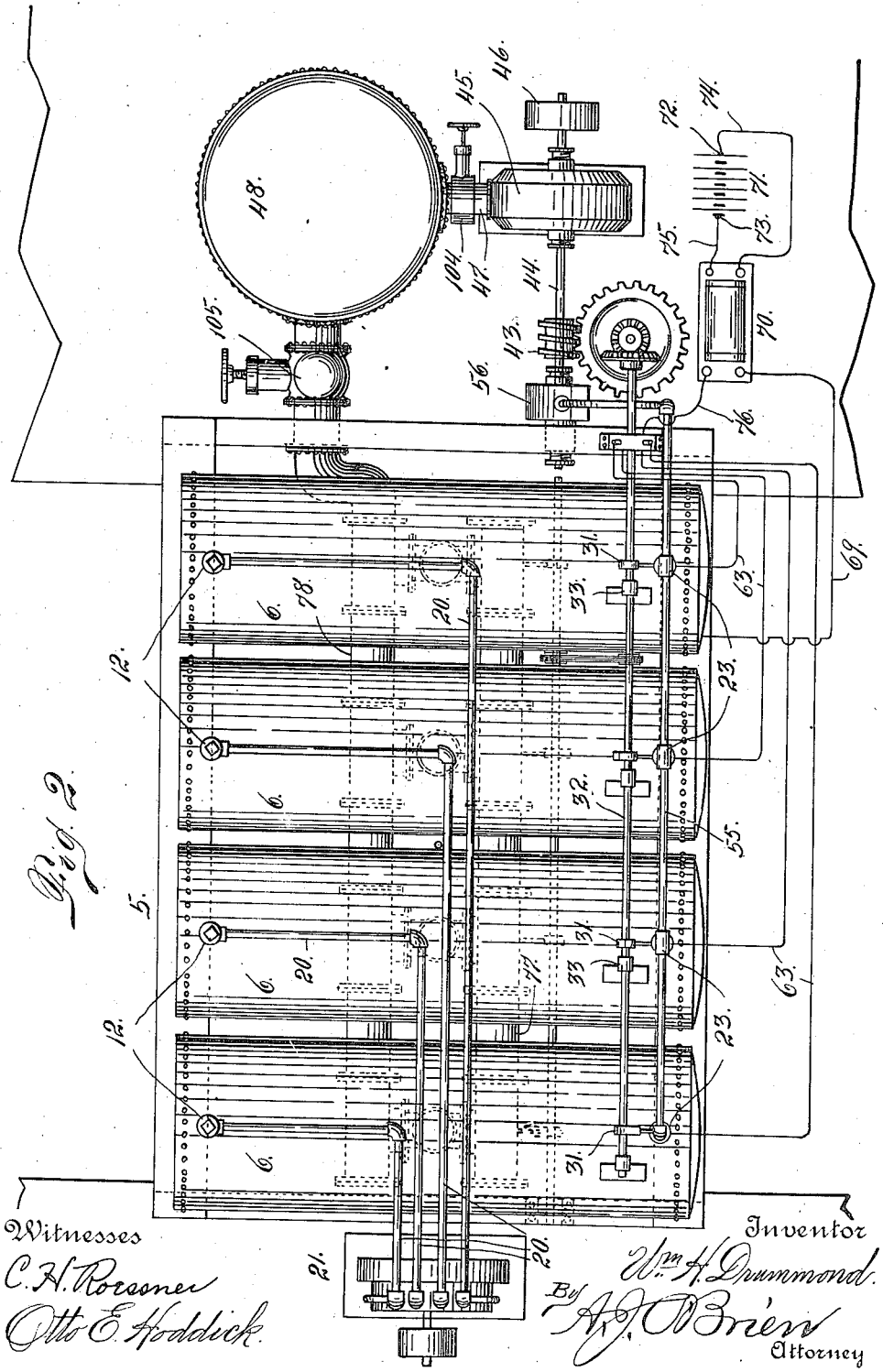

W. H. DRUMMOND.
APPARATUS FOR PRODUCING POWER.
APPLICATION FILED SEPT. 11, 1911.
1,041,253.
Patented Oct. 15, 1912.
4 SHEETS—SHEET 3.
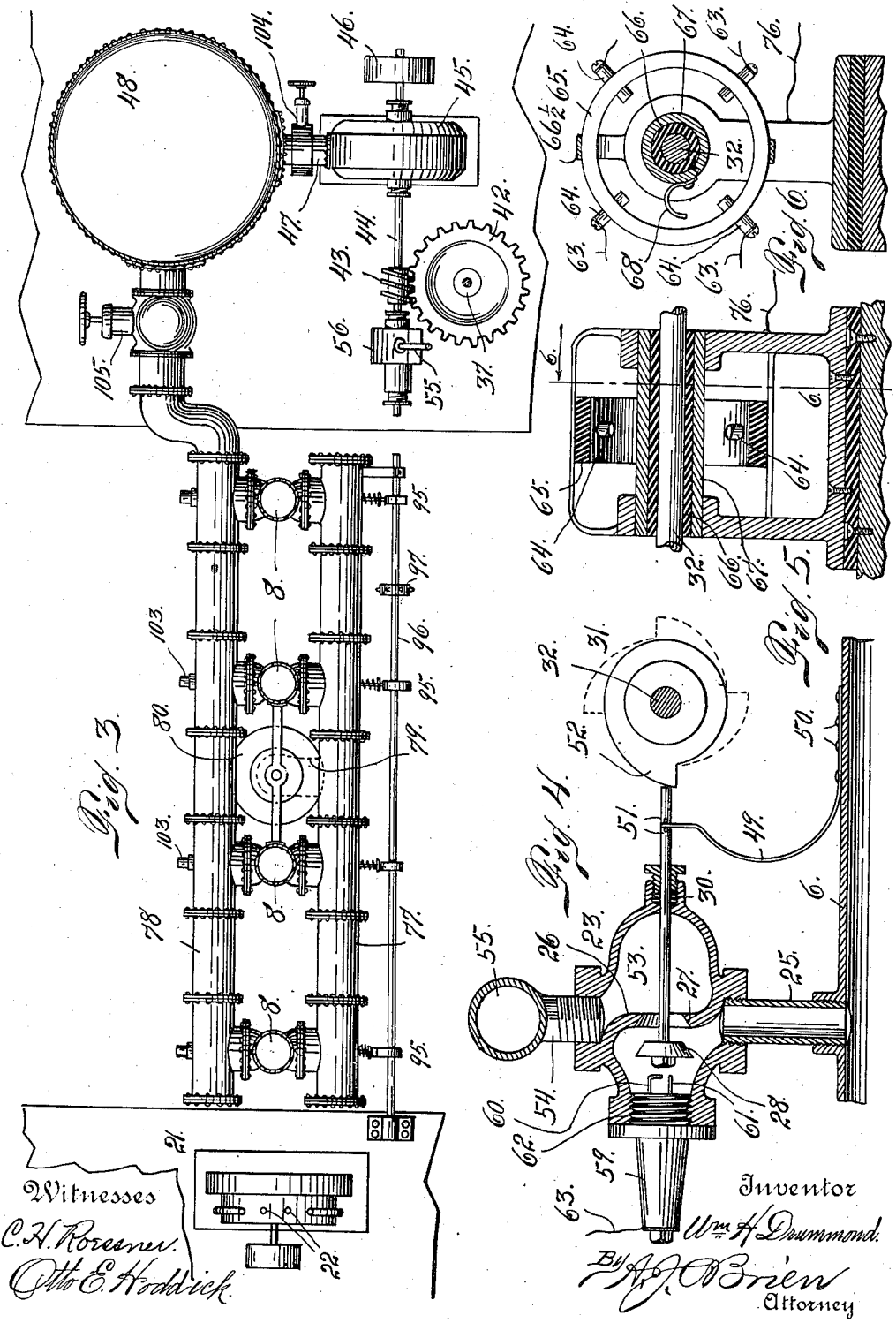
Witnesses
C. H. Roesner
Otto E. Hoddick
Inventor
Wm. H. Drummond.
By A. J. O'Brien
Attorney W. H. DRUMMOND.
APPARATUS FOR PRODUCING POWER.
APPLICATION FILED SEPT. 11, 1911.
1,041,253.
Patented Oct. 15, 1912.
4 SHEETS—SHEET 4.
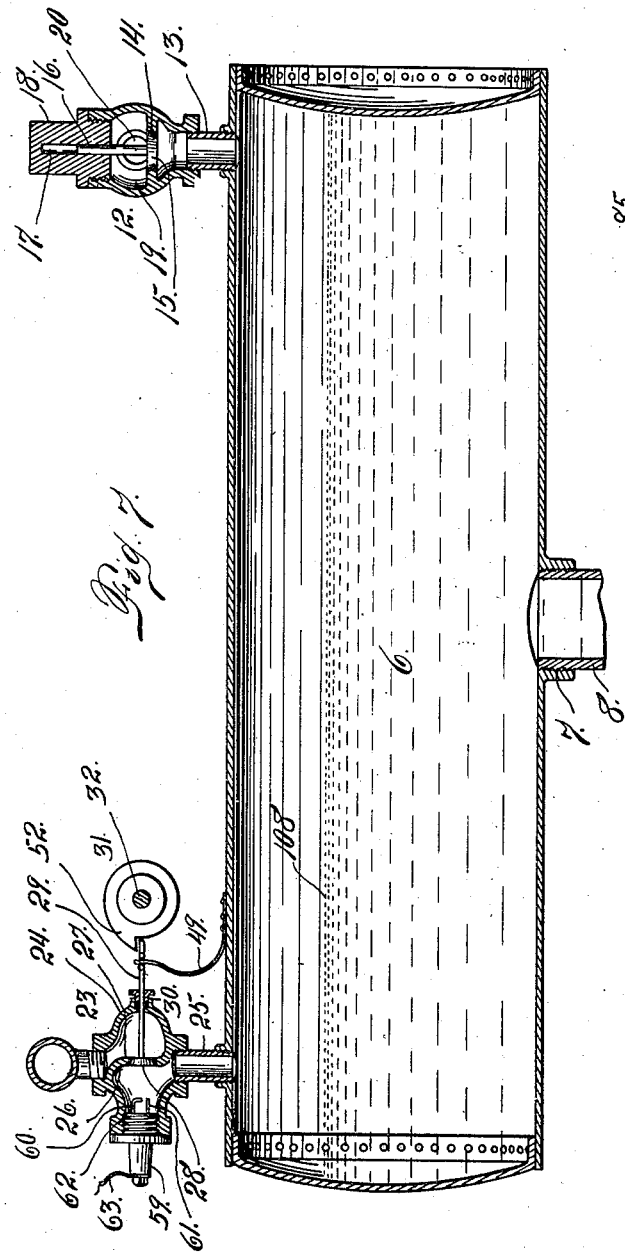
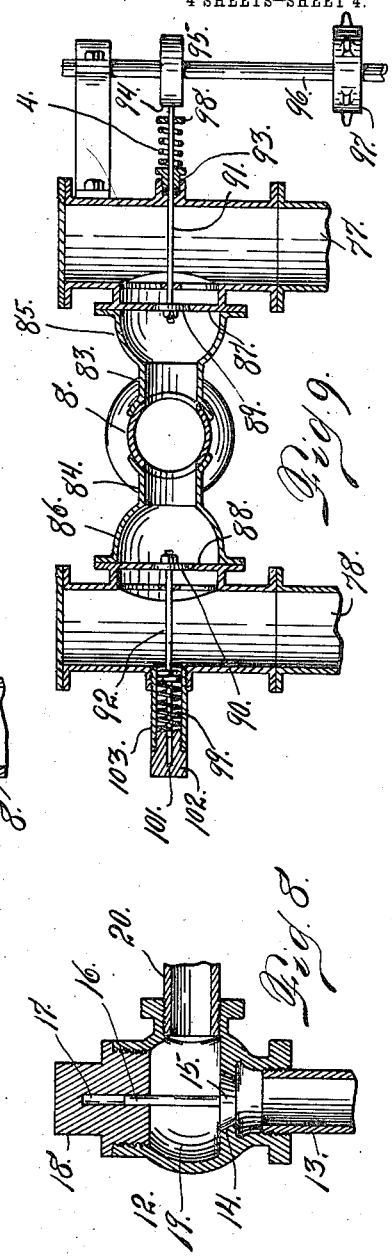
Witnesses
C. H. Roesner
Otto E. Hoddick
Inventor
Wm. H. Drummond.
By A. J. O'Brien
Attorney

UNITED STATES PATENT OFFICE.

WILLIAM HENRY DRUMMOND, OF DENVER, COLORADO, ASSIGNOR TO DRUMMOND ATMOSPHERIC PUMP COMPANY, OF DENVER, COLORADO, A CORPORATION OF ARIZONA.

APPARATUS FOR PRODUCING POWER.

1,041,253.

Specification of Letters Patent. Patented Oct. 15, 1912.

Application filed September 11, 1911. Serial No. 648,793.

*To all whom it may concern:*

Be it known that I, WILLIAM HENRY DRUMMOND, a citizen of the United States, residing in the city and county of Denver and State of Colorado, have invented certain new and useful Improvements in Apparatus for Producing Power; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in apparatus for producing power. The mechanism includes any desired number of tanks connected with a water supply source and arranged to receive an explosive mixture at predetermined intervals, the mixture being automatically and successively exploded in the several tanks, whereby a vacuum is produced and water from the supply source caused to enter in response to the vacuum. As soon as the water has risen to a predetermined distance in the tanks, the vacuum is automatically broken by opening communication between the upper portions of the tanks above the water level and a carbureter, whereby the explosive mixture is caused to enter, the mixture being acted on by a blower to facilitate its rapid entrance to the tanks. As soon as the vacuum is broken, the water begins to leave the tanks by gravity, a valve being automatically opened for the purpose. After the water has lowered in the tanks to a predetermined level, the inlet for the explosive mixture is closed and the mixture exploded, whereby the remainder of the water is forced out of the tanks through a spring-retained valve, this water passing to a reservoir connected with a water-wheel, which the water engages as it leaves the tank, this water-wheel being employed to develop power to operate the movable parts of the apparatus, and also for other purposes. The water which leaves the tanks by gravity passes to a water-wheel or motor equipped with a shaft provided with a pulley, which may be connected with any suitable machine. The force developed by the explosion in the tanks is also utilized, being conducted through pipes to a motor or engine of suitable character. Hence, by virtue of my improved construction, three forces are utilized for power developing purposes, one being the force of the explosion in the tanks, another that developed by the water as it leaves the tanks by gravity, and a third that developed by the water, as it is forced out of the tanks by the power of the explosions therein.

Having briefly outlined my improved construction, I will proceed to describe the same in detail, reference being made to the accompanying drawings, in which is illustrated an embodiment thereof.

In this drawing: Figure 1 is an elevation of the apparatus, looking in the direction of the ends of the tanks, forming a part of the construction. Fig. 2 is a top plan view of the same, or a view looking in the direction of arrow 2, Fig. 1. Fig. 3 is a horizontal section, taken on the line 3—3 of Fig. 1, looking downwardly, or in the direction of the arrow. Fig. 4 is a sectional view in detail taken on the line 4—4, Fig. 1, looking in the direction of the arrow and on a larger scale, illustrating the connection between the tanks and the carbureter for supplying explosive mixture and also the valve mechanism in connection therewith. Fig. 5 is a sectional view taken through a device for successively closing the spark plug circuit, through the instrumentality of which the explosions in the tanks are properly timed. In this view, the parts are shown on a larger scale than in Figs. 1 to 3, inclusive. Fig. 6 is a section, taken on the line 6—6 of Fig. 5. Fig. 7 is a vertical, longitudinal section, taken through one of the tanks, the same being shown on a larger scale than in Figs. 1 and 2. Fig. 8 is a detail view of a check valve for controlling the escape of the explosive force from the tanks, shown on a larger scale. Fig. 9 is a horizontal section, illustrating the connection between the tanks and two pipes, one of which conducts water by gravity to a waterwheel or motor, while the other delivers water to the reservoir, the water passing to the reservoir under the influence of the explosions in the tanks. In this view the parts are shown on a larger scale than in Figs. 1, 2 and 3. Fig. 10 is a detail view of a check valve for controlling the admission of water to the tank, shown on a larger scale.

The same reference characters indicate the same parts in all the views.

Let the numeral 5 designate a suitable framework upon which is mounted a number of tanks 6. The apparatus may be composed of any desired number of tanks or units, the operation being substantially the same in character whether one or more tanks are employed. The number may, of course, be increased to any extent, depending upon the power capacity required of the apparatus. The lower part of each tank is connected, as shown at 7, with a standpipe 8, whose lower extremity protrudes into a source of water 9, being equipped with a check valve 10, adapted to open in response to a vacuum in the corresponding tank, and close under the influence of the downward pressure of the water, whereby the latter may be carried through other pipes for power development purposes.

To one extremity of each tank is connected a valve 12 by means of a short pipe 13. The valve casing is equipped with a seat 14 for a valve piece 15, having a stem 16 movable in a recess 17 of a plug 18 threaded into the top of the valve casing. With the valve chamber 19 above the check valve is connected a pipe 20, which leads to an engine or motor 21, the pipe being connected with the motor as shown at 22, as best illustrated in Figs. 1 and 2. The explosive force in each tank serves to open the valve piece 15, whereby this force is allowed to pass through the pipe 20 to the motor 21, the check valve subsequently closing whereby the pressure is trapped and prevented from returning to the tank. At the opposite extremity of each tank 6 is located valve mechanism 23, comprising a casing 24 connected with the tank by a short pipe 25, the casing being equipped interiorly with a partition 26, in which is formed a seat 27 for a valve piece 28, whose stem 29 passes through a stuffing box 30. This stem protrudes beyond the valve casing into the path of a cam 31, fast on a shaft 32 journaled in bearings 33 supported on the tanks by brackets 34. One extremity of the shaft is equipped with a beveled gear 35, which meshes with a similar, and preferably smaller, gear 36, fast on the upper extremity of a vertical shaft 37, the latter being journaled in a bearing 38, mounted on the outer extremity of a bracket 39 carried by a standard 40. The lower extremity of the shaft 37 is journaled in a step box 41. Mounted on the shaft 37, above the step box, is a worm-wheel 42, whose teeth engage a worm 43, fast on a shaft 44, operated from a water-wheel 45. This shaft protrudes beyond the water-wheel on the opposite side from the worm, and is equipped with a pulley 46, which may be connected by means of a belt for operating machinery or doing work of any kind, the water wheel being connected by means of a pipe 47 with a reservoir 48, which receives its water supply from the tank 6 in a manner which will be hereinafter explained in detail. The stem 29 of the valve 28 is connected beyond the valve casing with a leaf-spring 49, which is secured to the top of the tank 6 by means of rivets 50 or other suitable fastening devices. The opposite extremity of the spring protrudes between two pins or lugs 51, mounted on the stem of the valve. The function of this spring is to automatically close the valve piece 28 as soon as the cam 52 of the wheel 31 has released the stem.

The compartment 53 of the valve casing is connected by means of a short pipe 54, with a conduit 55, whose opposite extremity leads to a blower 56 connected with a carbureter 57 for supplying explosive mixture to the tank 6. This carbureter is supplied with gasolene, or other suitable volatile liquid, by means of a pipe 58 leading to any suitable source of supply, not shown.

Mounted on each valve device 23 is a spark plug 59, whose electrodes 60 and 61 are concealed within the valve chamber, the spark plug being threaded into the valve casing, as shown at 62. One of these electrodes is connected with an electrical conductor 63 leading from a contact 64 carried by a ring 65. Four contacts 64 are mounted on this ring, being equi-distantly spaced. The ring is stationary, being mounted upon a frame 66½. The ring is composed of insulating material. This ring surrounds the shaft 32. To the shaft where the ring is located is applied an insulating collar 66, upon which is mounted a metal collar 67, to which is secured a spring contact 68. The contacts 64 project from the ring on both sides, and their inner extremities lie in the path of the spring contact 68. Hence, as the shaft rotates, this spring contact is successively brought into engagement with the stationary contacts 64, whereby the spark plug circuits are successively closed through the electrodes 60 and 61, connected with each tank, as heretofore explained. One branch of the circuit is completed through the metal parts of the apparatus by means of a conductor 69, leading from one of the terminals of a secondary coil 70. The electrical source is designated 71, and its poles 72 and 73 are respectively connected with the primary coil by conductors 74 and 75. The conductor leading from the other terminal of the secondary coil is designated 76 and leads to the frame 66½ supporting the ring 65, as heretofore explained.

Arranged below the tank 6 and suitably mounted above the water supply source 9 are two pipes designated 77 and 78, respectively. The pipe 78 is connected with the reservoir 48, while the pipe 77 is connected by means of a branch 79 with a water-wheel 80, equipped with a vertically-disposed shaft 81, journaled in a bracket 82, mounted on two of the stand pipes 8. The stand pipe 8 of each tank is connected with the two pipes 77 and 78, by means of short pipe members 83 and 84, these pipe members merging into casings 85 and 86, provided with partitions 87 and 88, provided with openings normally closed by valves 89 and 90, engaging seats formed in their respective partitions. These valves are equipped with stems 91 and 92. The stem 91 passes through a stuffing box 93, and protrudes through and beyond the pipe 77 in the path of a cam 94, formed on a cam wheel 95, fast on a shaft 96, suitably journaled and operated from the shaft 32 by means of a suitable connection. As illustrated in the drawing, the sprocket wheel 95, fast on the shaft 32 is connected by means of a chain 106, with a similar sprocket wheel 97, fast on a shaft 96. Each valve 89 is normally closed by a coil spring 4, surrounding its stem and interposed between the stuffing box 93 at one extremity and a stop 98 fast on the stem 91, the said stop engaging the other extremity of the spring.

By the opening of the valve 89 communication is established through the corresponding standpipe 8, connected with one of the tanks, and the pipe 77, connected with the water-wheel or motor 80, as heretofore explained.

The two shafts 32 and 96 are operated in harmony, and the cam wheels 95 and 31 simultaneously open the valves 89 and 28, whereby the water escapes by gravity from each tank into the pipe 77, and thence to the water-wheel or motor 80 simultaneously with the breaking of the vacuum in the upper part of the tank and the entrance of the explosive mixtures. In the meantime, the valve 90 remains closed by means of a spring 99, surrounding the valve stem 92, which protrudes into a recess 101 formed in a plug 102 threaded into a casing 103, connected with the pipe 78.

Now, as soon as the charge of explosive mixture has been supplied to a tank 6 and the water has reached a suitable predetermined low level, the explosion takes place and the balance of the water is ejected from the tank by the force of this explosion. Just before the explosion takes place, the valve 89 is automatically closed by being released from the operation of the cam 94. The force of the water, driven out of the tank by the explosion, opens the valve 90, allowing the water to enter the pipe 78, whence it passes under the force of the explosion into the lower part of the reservoir 48. As the water rises in this reservoir, it compresses the air in the upper part thereof, whereby the water is normally under pressure and passes out of the reservoir to the water-wheel 45, as heretofore explained.

There is a valve 104 located in the pipe 47, whereby the water in the reservoir may be cut off from the wheel 45, if desired. There is also a valve 105, located in the pipe 78, near the reservoir 48, whereby the reservoir may be cut off from the pipe 78.

From the foregoing description, the use and operation of my improved power apparatus will be readily understood. For the purpose of starting the apparatus, it may be assumed that the reservoir 48 contains a suitable quantity of water, the same being retained therein by the valve 104. By opening this valve, the water may be allowed to pass to the wheel 45, thus rotating the shaft 44 and communicating motion through the worm gear and the vertical shaft 37 to the shaft 32, and thence to the shaft 96, through the instrumentality of the chain 106 and the sprocket wheels 95 and 97. The shaft 44 also operates the blower 56, which is connected with the carbureter 57, as heretofore explained.

It must be assumed that there is also a quantity of water in each of the tanks 6, whereby their communication to the pipe 77 is sealed. The valves 89 and 28 are simultaneously open, breaking the vacuum in the upper part of the tank 6, and allowing the water in the tank to flow into the pipe 77 by virtue of the opening of the valve 89. As the water passes out of the tank, the explosive mixture passes thereinto, the operation being continued until the water has reached a predetermined low level in the tank, when the two valves 89 and 28 are released from the action of their operating cams and closed by virtue of their actuating springs 49 and 4, as heretofore explained. As soon as the explosion occurs, the water is forced out of the tank into the pipe 78, the check valve 90 being opened by the force of the explosion for the purpose, the water passing through the pipe 78 to the reservoir 48. At the same time, the pressure of the explosion passes out of the tank and through a pipe 20 to the engine or motor 21, the valve 15 automatically closing after the explosion. The force of the explosion produces a vacuum in the tank, and, as all the outlet valves connected with the tank are closed as soon as the force of the explosion has been exhausted, the water will rise in the tank through its corresponding standpipe 8 until it reaches a predetermined level approximately that indicated by the dotted line 108. As soon as this occurs, the vacuum will be broken in the upper part of the tank by the opening of the valve 28, while the pipe 77 will be placed in communication with the tank through the opening of the valve 89, and the operation heretofore described will be repeated.

From the foregoing, it will be understood that the explosions take place successively in the various tanks 6, by virtue of the successive closing of the spark plug circuits connected with the respective tanks, and the other mechanism arranged to harmonize therewith. By virtue of this arrangement, any desired number of tanks may be arranged in a single plant, and the explosions therein successfully effected.

Having thus described my invention, what I claim is:

1. The combination with a tank and a source of explosive mixture, of a conduit leading from the explosive mixture source to the tank, a normally closed check valve located in said conduit, a motor, a check-valve-controlled conduit leading from the upper part of the tank to the motor through which the explosive force travels to the motor, a check-valve-controlled conduit adapted to connect the lower part of the tank with a source of water supply, to allow the water to enter the tank but preventing its return to the source, a water outlet connected with the lower part of the tank through the last-named conduit, above the check valve of said conduit, a normally closed check-valve located in said outlet, and means for simultaneously opening the said check-valves to allow the explosive mixture to enter the tank and the water to escape therefrom during equal periods and at equally timed intervals, and a water motor to which the water passes from the tank outlet.

2. The combination with a tank, and a water supply source, of a pipe connecting the lower part of the tank with the source of supply, an inwardly-opening check-valve located in said pipe, a source of explosive mixture, a conduit leading therefrom to the upper part of the tank above the water level, a normally closed check-valve located in said conduit, a water outlet leading from the lower part of the tank and connected with the water supply pipe above the check valve contained therein, a normally closed check valve located in said outlet, means for simultaneously opening the check valves in the explosive-mixture-supply pipe and the water outlet pipe and holding the same open until the water has partly escaped from the tank by gravity, means for exploding the mixture in the tank simultaneously with the closing of the last-named check-valves, a second water outlet in communication with the lower part of the tank through the said water supply pipe above the check valve therein and provided with a spring-closed outwardly-opening check-valve arranged to open in response to the pressure of the water under the influence of the explosion in the tank, and a storage reservoir in communication with the second outlet.

3. The combination with a tank and a source of water supply, of a pipe connecting the lower part of the tank with the said source, a check-valve to allow the water to enter the pipe from the source but preventing its return, a source of explosive mixture, a conduit leading therefrom to the upper part of the tank above the water level, a normally closed check-valve located in the said last-named conduit, a water outlet leading from the lower part of the tank and connected with the water supply pipe above the check valve therein, a normally closed check-valve located in said outlet, means for simultaneously opening the check valves in the explosive-mixture-supply pipe and the water outlet pipe and maintain the same in the open position until the water has partly escaped from the tank by gravity, means for exploding the mixture in the tank simultaneously with the closing of the check-valves in the explosive-mixture-pipe and the said water outlet pipe, a second water outlet leading from the lower part of the tank through the said water supply pipe, above the valve contained therein and provided with a spring-closed outwardly-opening check-valve arranged to open in response to the pressure of the water under the influence of the explosion in the tank, a water storage reservoir in communication with the second outlet, and a water motor arranged to be operated by the water from said reservoir, substantially as described.

4. The combination with a number of tanks and a water supply source, of a conduit connecting the lower part of each tank with said source of water supply, an inwardly-opening check-valve in each pipe, a source of explosive mixture, a pipe connecting said source with the upper part of each tank, a normally closed check-valve interposed between each tank and the explosive-mixture-supply pipe, a water outlet connected with the lower part of each tank, a normally closed check-valve located in each water outlet, means for successively opening the check valves to allow the explosive mixture to enter the said tanks, and means for successively opening the check-valves in the water outlets, to allow the water to escape from said tanks by gravity, the supply of explosive mixture to each tank being timed to correspond with the period of escape of the water by gravity from the same tank.

5. The combination with a number of tanks, of a water supply source, conduits connecting the lower part of the respective tanks with said source of water supply, inwardly-opening check-valves in the said pipes, a source of explosive mixture, pipes connecting said source with the upper portions of the respective tanks, a normally closed check-valve interposed between each tank and the explosive-mixture-supply pipe, a water outlet leading from the lower part of each tank through the water supply conduits above the check valve therein, a normally closed check-valve located in each outlet, means for successively opening the check-valves to allow explosive mixture to enter the said tanks, means for successively opening the check valves in the water outlets to allow the water to escape from said tanks by gravity, the supply of explosive mixture to each tank being timed to correspond to the period of escape of the water by gravity from the same tank, means for successively producing explosions in the several tanks, the explosion in each tank being simultaneous with the cutting off of the explosive mixture and the cutting off of the gravity water-escape, a secondary water outlet leading from the lower part of each tank through the said water supply conduits, above the valves therein, a spring-seated outwardly-opening check-valve located in said last-named outlet of each tank, the said valve being adapted to be opened by the pressure of the water acted on by the explosive force.

6. The combination with a plurality of tanks, and a water supply source, of conduits connecting the lower portions of the several tanks with said source, an inwardly-opening check valve in each pipe, a source of explosive mixture, a pipe connecting said source with the upper part of each tank, a normally closed check valve interposed between each tank and the explosive-mixture-supply pipe, a primary water outlet leading from the lower part of each tank through the water supply conduits, above the check valves therein, a normally closed check-valve located in each of said outlets, means for successively opening the check-valves to allow the explosive mixture to enter the said tanks, means for successively opening the check valves in the primary water outlets to allow the water to escape from said tanks by gravity, the supply of explosive mixture to each tank being timed to correspond with the period of escape of the water by gravity from the same tank, means for successively producing explosions in the several tanks, the explosion in each tank being simultaneous with the cutting off of the explosive mixture and the cutting off of the primary water escape, a secondary water outlet leading from the lower part of each tank through the said water supply conduits, above the valves therein, a spring-seated outwardly-opening check valve located in said last-named outlet, the said valve being adapted to be opened by the pressure of the water acted on by the explosive force, a conduit with which all of the secondary outlets from the tanks are connected, and a storage reservoir to which each of said conduits leads.

7. The combination with a number of tanks, of a water supply source, conduits connecting the lower portions of the respective tanks with said source of water supply, an inwardly-opening check-valve in each of said pipes, a source of explosive mixture, pipes connecting said source with the upper portions of the respective tanks, a normally closed check-valve interposed between each tank and the pipe for supplying explosive mixture, water outlet pipes leading from the lower portions of the respective tanks through the water supply conduits, above the check valves contained therein, normally closed check-valves located in the said outlet pipes, means for successively opening the check-valves to allow the explosive mixture to enter the said tanks, means for successively opening the check valves in the water outlet pipes to allow the water to escape from the said tanks by gravity, the supply of explosive mixture to each tank being timed to correspond with the period of escape of the water by gravity in the same tank, means for successively producing explosions in the tanks, the explosion in each tank being simultaneous with the cutting off of the explosive mixture from the tank and the cutting off of the gravity water-escape, secondary water outlet pipes leading from the lower portions of the respective tanks through the said water supply conduits, above the valves therein, spring-seated outwardly-opening check-valves located in said outlet pipes, the said valves being adapted to be opened by the pressure of the water acted on by the explosive force, a conduit with which all of the secondary outlets from the tanks are connected, a storage reservoir to which said last-named conduit leads, and a water motor connected in operative relation with said reservoir.

8. The combination with a tank and a source of water supply, of a pipe leading from the said source of supply and connected with the lower part of the said tank and equipped with an inwardly-opening check-valve, a pipe leading from the upper part of the tank, a motor with which said pipe is connected, a check-valve located in said last-named pipe, a source of explosive mixture, a pipe leading from said source to the upper part of the tank, a normally closed check-valve interposed in the said pipe for regulating the supply of explosive mixture to the tank, a water outlet pipe leading from the tank through the first-named pipe above the check valve therein, a normally closed check valve located in said pipe, means for simultaneously opening the check valve for regulating the supply of explosive mixture to the tank and the check valve located in the water outlet pipe, a water motor connected to receive the water from the water outlet pipe, a secondary water outlet in communication with the lower part of the tank through the said first-named pipe, above the valve therein, a normally closed outwardly-opening check valve located in the secondary outlet and adapted to open in response to the explosive force within the tank, a reservoir with which the secondary outlet is connected, a water motor in communication with the said reservoir, and means for exploding the explosive mixture within the tank when the water has reached a predetermined low level, the mechanism being arranged to produce the said explosion simultaneously with the cutting off of the supply of explosive mixture to the tank and the cutting off of the escape of the water to the primary water outlet, substantially as described.

In testimony whereof I affix my signature in presence of two witnesses.

WILLIAM HENRY DRUMMOND.

Witnesses:
    A. J. O'Brien,
    C. E. Bróden.